United States Patent
Bramley et al.

(10) Patent No.: US 6,275,535 B1
(45) Date of Patent: Aug. 14, 2001

(54) METHOD AND DEVICE FOR DECODING AN IMAGE COMPRESSED IN PARTICULAR ACCORDING TO THE MPEG STANDARDS, ESPECIALLY A BIDIRECTIONAL IMAGE

(75) Inventors: Richard Bramley, Grenoble (FR); Patrice Woodward, Bristol (GB)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/324,873

(22) Filed: Jun. 2, 1999

(30) Foreign Application Priority Data

Jun. 23, 1998 (FR) .................................................. 9807934

(51) Int. Cl.[7] .................................................. H04N 7/12
(52) U.S. Cl. .................................................. 375/240.25
(58) Field of Search ........................ 375/240.25, 240.26, 375/240.27, 240.28, 240.15; 348/425.1, 425.2, 425.3, 425.4, 415.1; 382/233, 236, 238; 386/111; 358/261.2, 430

(56) References Cited

U.S. PATENT DOCUMENTS 5,517,250 * 5/1996 Hoogenboom et al. ............ 348/467
5,701,158 * 12/1997 Ohira et al. ........................ 348/410.1
5,798,804 * 8/1998 Okitsu ............................... 348/845.3
5,991,503 * 11/1999 Miyasaka et al. .................... 386/111
6,141,385 * 10/2000 Yamaji .............................. 375/240.27

FOREIGN PATENT DOCUMENTS

| 0 725 399 A2 | 1/1996 | (EP) | H04N/5/85 |
| 0 732 857 A1 | 3/1996 | (EP) | H04N/7/50 |
| 0714213-A2 * | 5/1996 | (EP) | H04N/7/50 |
| 2000032473-A * | 1/2000 | (JP) | H04N/7/32 |
| 97/11562 | 3/1997 | (WO) | H04N/7/50 |

* cited by examiner

Primary Examiner—Vu Le
(74) Attorney, Agent, or Firm—Theodore E. Galanthay; Allen, Dyer, Doppelt, Milbrath & Gilchrist, P.A.

(57) ABSTRACT

A method and device decode a compressed image, and in particular, an image compressed according to the MPEG standards, especially a bidirectional image. To perform two successive decodings of a bidirectional image, the address of the data packet containing the start-of-image identifier of the bidirectional image is tagged, and the temporal reference of this image is stored. After the first decoding, the stored address of the memory is again pointed to and a second decoding is performed after a new detection of the temporal reference of the image.

22 Claims, 7 Drawing Sheets

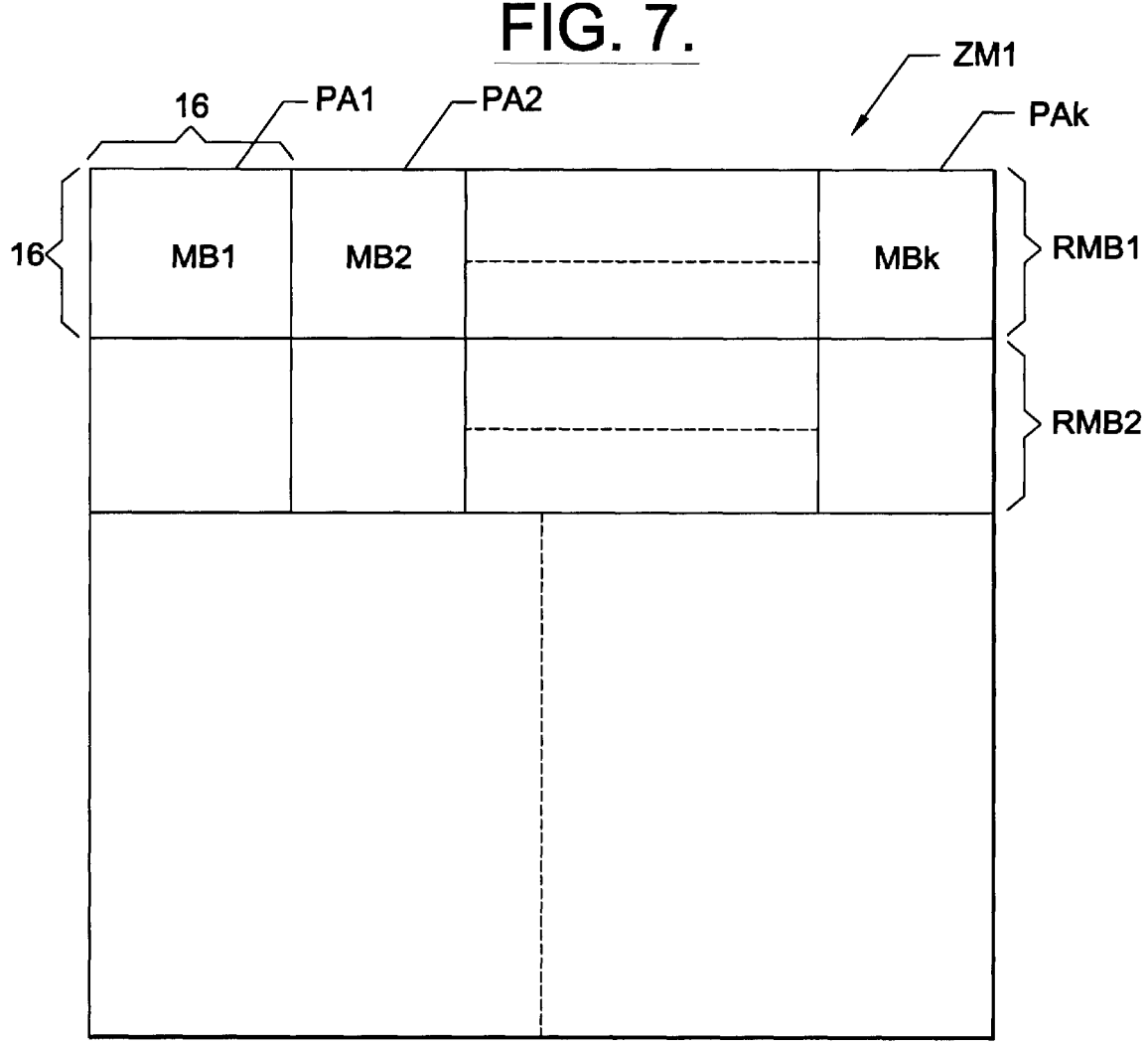

METHOD AND DEVICE FOR DECODING AN IMAGE COMPRESSED IN PARTICULAR ACCORDING TO THE MPEG STANDARDS, ESPECIALLY A BIDIRECTIONAL IMAGE

FIELD OF THE INVENTION

The invention relates to the decoding of compressed images and in particular to the decoding of images which are compressed according to an MPEG standard. The invention also relates to the display of the decoded images. More particularly, the invention relates to the decoding of bidirectional images.

BACKGROUND OF THE INVENTION

According to various image compression standards, especially MPEG ("Motion Pictures Experts Group"), the images are decoded in blocks, or macroblocks, generally of 16×16 pixels. The macroblocks can be of various formats. The most commonly used format is the one termed 4:2:0 according to which each macroblock contains four blocks of 8×8 luminance pixels of eight bits and two blocks of 8×8 chrominance pixels of eight bits.

The images processed are essentially of three types, namely an "intra" type, a "predicted" type and a "bidirectional" type. The person skilled in the art is aware that the macroblocks of an "intra" image do not undergo any motion compensation. In a predicted image, each macroblock can undergo a motion compensation which includes combining the macroblock with another macroblock, the "predictor", fetched from a previously decoded image. Each macroblock of a bidirectional image can undergo a motion compensation which includes combining the macroblock with two other predictor macroblocks, fetched respectively from two previously decoded images. The positions of the predictor macroblocks are determined by motion vectors.

An MPEG decoding/display system, referred to more simply hereafter as an "MPEG decoder", must communicate to a dynamic memory to carry out the decoding and the displaying of the decoded images. Such a memory plays an essential role in the decoding and displaying of these images. In certain modes of operation (freeze frame for example), certain images have to be decoded several times. These multiple decodings require repeated access to the area of the image memory storing the compressed image data awaiting processing. In particular, it is especially important to be able to redecode, without the risk of errors originating from the addressing of the memory, the right compressed data actually corresponding to an image already previously decoded.

SUMMARY OF THE INVENTION

It is an object of the invention to provide a solution to this problem, which is simple to implement and to embody. The invention applies especially, but not exclusively, to the "on-the-fly" decoding of bidirectional images, which decoding is effected twice while the two frames of the image are displayed directly, and which does not require storage of the decoded bidirectional image in the image memory, thus reducing the image memory size.

The invention therefore proposes a method for decoding an inbound image, for example a bidirectional image in which a memory area of a dynamic memory is used to store a stream of compressed data comprising successive groups of compressed data. These groups relate respectively to successive inbound images, some of which require two successive decodings. Each data group associated with an image comprises a start-of-image identifier (or picture start code), followed by a header containing a specific identifier of the image (for example the temporal reference of this image), this header being followed by useful data. The stream of data is read in packets of bits located at consecutive addresses of the memory area. For each packet extracted from the memory area, the presence or the absence of a start-of-image identifier is detected, and when a detected start-of-image identifier corresponds to an image requiring two successive decodings, the address of the relevant packet is stored together with the specific identifier of the image. Then a first decoding of the useful data of the image is performed, on completion of which the packet situated at the stored address is extracted again from the memory area. The second decoding of the image is then carried out by decoding the data of the packet after detection of the specific identifier. The data of the packet preceding the specific identifier is ignored for the decoding.

In an MPEG data stream, one difficulty in carrying out two successive decodings of the same image resides in the fact that the intervals between the various start-of-image identifiers of the various images are not constant and depend on the contents of the images. Moreover, the image memory is in practice read in packets of bits situated at successive addresses of the memory.

A first characteristic of the invention therefore includes storing the address of the bit packet in which the start identifier of an image requiring two successive decodings, for example a bidirectional image, has been detected. This being so, if, the first decoding having been performed, a return is made to the memory area to repoint to the bit packet containing the start-of-image identifier, then the position of this start-of-image identifier is not accurately known in the packet. Moreover, it is not certain that the packet might not comprise other start-of-image identifiers corresponding to previous images. Stated otherwise, if a second decoding of the data arising from the packet situated at the address returned to for positioning, were then performed without precaution, a second, erroneous, decoding of the image would be obtained.

The invention solves these additional difficulties by providing, in addition to the above described features, a second characteristic including storing a specific identifier (for example, the temporal reference of the image) making it possible to tag the image in a one-to-one manner in the sequence. Thus, after having returned back and having again extracted the packet containing the start-of-image identifier of the image to be redecoded, the bits of the packet are analyzed sequentially until the presence of the specific identifier of the bidirectional image to be redecoded is detected again. And it is only from this instant onwards that the pipeline circuit conventionally used in an MPEG decoder will be able to take into account the useful data of this image in such a way as to perform the second decoding thereof.

The subject of the invention is also a device for decoding an inbound image, comprising a dynamic memory including a memory area storing a stream of compressed data comprising successive groups of compressed data, which groups relate respectively to successive inbound images, certain of which require two successive decodings. Each data group is associated with an image comprising a start-of-image identifier, followed by a header containing a specific identifier of the image, followed by useful data. The device also includes a first address pointer and a second address pointer, each making it possible to read the memory area in packets of bits, as well as a start-of-image identifier detector able to detect in each bit packet extracted at the address pointed at by the first address pointer, the presence or the absence of a start-of-image identifier.

Furthermore, the device includes a first storage means (for example a register) able to store in the presence of a first control signal representative of the presence of a current image requiring two successive decodings, the specific address of the packet containing the start-of-image identifier of the current image, and a second storage means (for example a second register) able to store in the presence of the first control signal, the specific identifier of the said current image. The device further includes processing means (for example a microprocessor) linked to the start-of-image identifier detector, able to deliver the first control signal, and a decoding circuit (pipeline circuit) able to decode the bits of each packet pointed at by the second address pointer. Also, the device includes pointer management means able, in response to a second control signal transmitted by the decoding circuit and representative of the end of a first decoding of an image, to move the second address pointer to the specific address stored in the first storage means, and decoding disabling means able to compare the contents of the second storage means with the information contained in the packet situated at the specific address and to disable the decoding circuit as long as the specific identifier of the image (temporal reference) is not detected again.

BRIEF DESCRIPTION OF THE DRAWINGS

Other advantages and characteristics of the invention will emerge on examining the detailed description of entirely non-limiting modes of implementation and embodiments, and the appended drawings in which.

FIG. 7 illustrates the organization of a dynamic memory into pages.

DETAILED DESCRIPTION OF THE PREFERRED EMBODIMENTS

The embodiment and mode of implementation which will now be described in detail relates especially to the decoding on the fly of bidirectional images and the displaying of these images, as well as the displaying of "intra" and "predicted" images decoded and stored in the image memory by way of a block/line conversion. This being so, as indicated earlier, the invention is not limited to this embodiment and relates generally to all cases in which an image requires at least two successive decodings, be they bidirectional images, or "intra" or "predicted" images, for example in a freeze frame, or fast forward or rewind mode of operation (otherwise known as "trick mode"). Furthermore, the organization of the dynamic memory into pages which is described below in combination with a block/line conversion, so as to minimize the number of page openings during the displaying of the stored images, is merely an exemplary embodiment and the present invention is not limited thereto.

Figure 1:
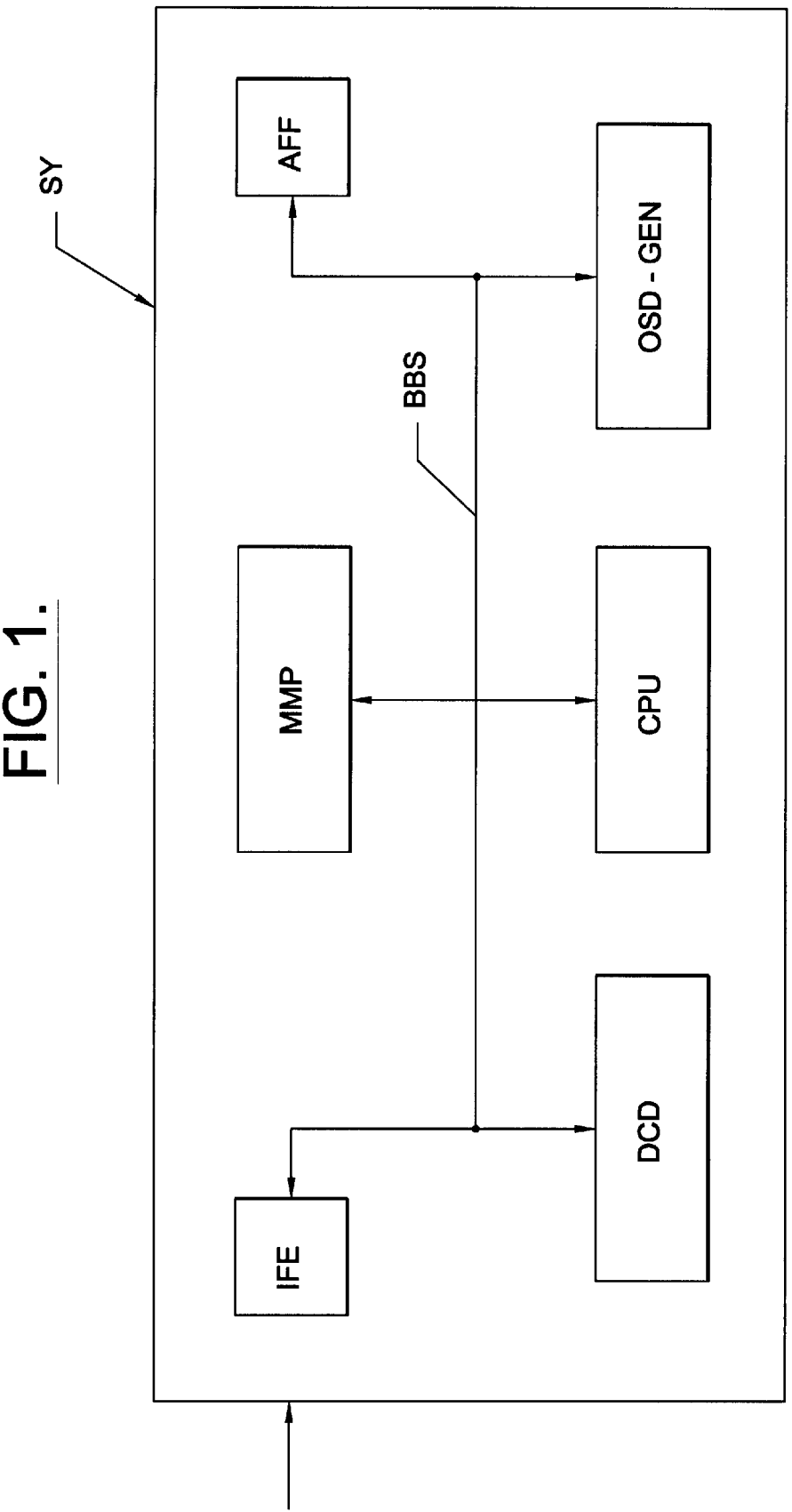
FIG. 1 is a schematic overview of a system for processing high-definition images incorporating an image decoding device according to the invention.

In FIG. 1, the reference SY generally denotes a system for processing digital images. The system incorporating, for example, a satellite decoder and/or television. In this system SY, input means IFE receive, for example, from a satellite antenna or from a digital disk (which are not represented here for the sake of simplification), a stream of data compressed according to, for example, the MPEG standards. A device DCD for processing images according to the invention, or MPEG decoder, decodes the coded images on the basis of these compressed data for the purpose of displaying them on a display screen AFF.

Moreover, the system SY comprises a microprocessor CPU which is able, for example, to manage the decoding of the various satellite channels, as well as a generator OSD-GEN of graphical information intended to be inlaid on the screen superimposed on the video images, for example, interactive menus obtained by actuating a television remote control. Finally, another element of this system SY is a dynamic memory MMP which is shared between these various elements. It is advantageous to limit the memory passband used so as to allow the various elements of the system SY to access it as often as possible. The assembly of elements of FIG. 1 communicate to one another via a bidirectional bus BBS.

Figure 2:
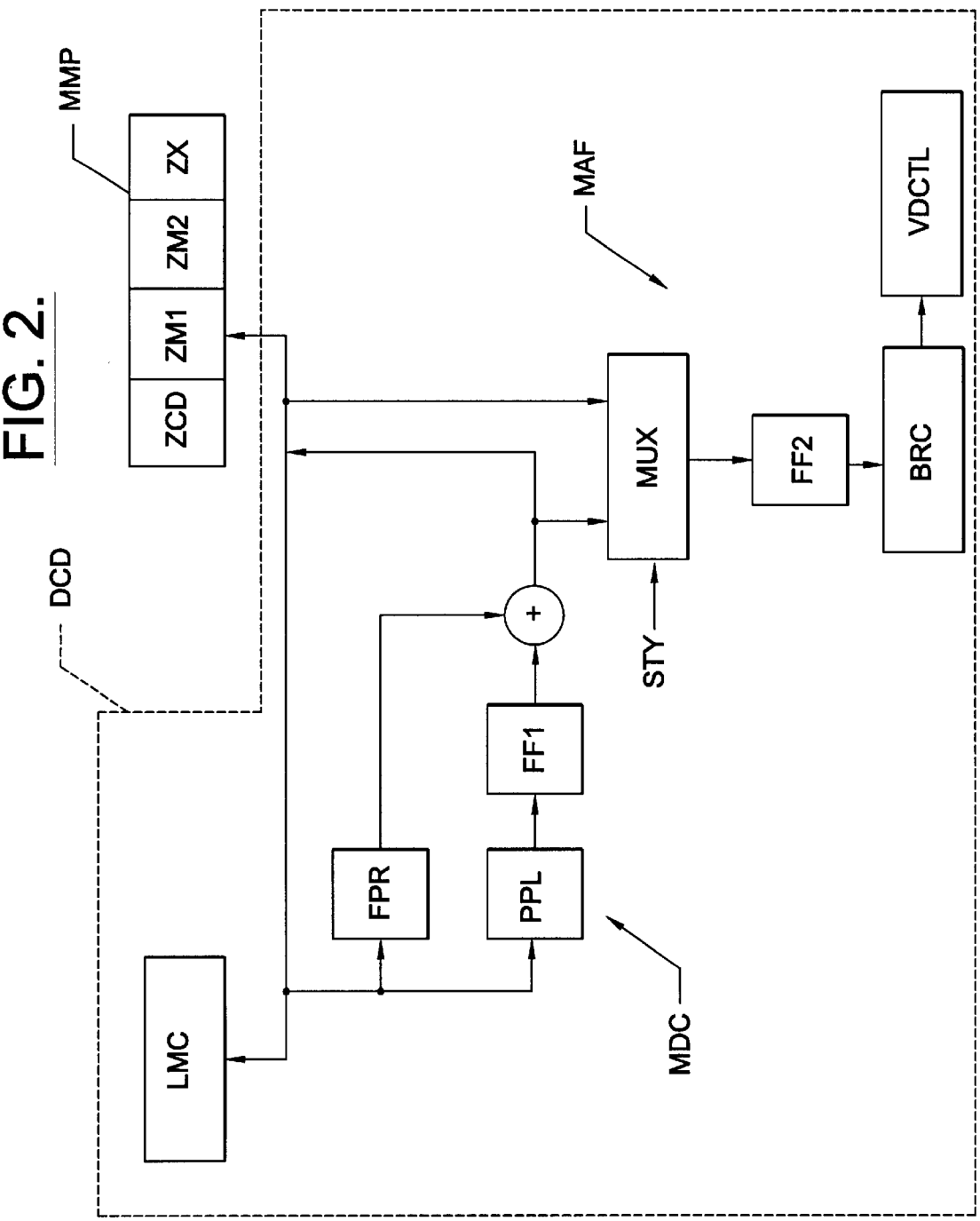
FIG. 2 is a more detailed schematic overview of a decoding device according to the invention.

In FIG. 2, the decoder DCD comprises decoding means MDC, and display management means MAF. The decoding means MDC comprises a pipeline circuit PPL which receives the compressed data through a 64-bit bus and delivers the luminance and chrominance blocks of the processed macroblocks, to an adder by way of a "first-in first-out" (FIFO) type memory FF1. Moreover, the adder receives corresponding blocks of filtered predictor macroblocks delivered by a prediction circuit FPR on the basis of predictor macroblocks extracted from the memory MMP.

The so-called "pipeline" circuit PPL generally performs a variable-length decoding (VLD), a run of zeros decoding (RLD), a zigzag scan to linear scan conversion and an inverse discrete cosine transform ($DCT^{-1}$), in a conventional manner. According to the MPEG standards, the prediction circuit FPR comprises a so-called "half-pixel" filter intended, if a motion vector making it possible to fetch a predictor macroblock is not integral, for shifting this predictor macroblock by a half-pixel vertically and/or horizontally. The decoding means MDC communicates by way of the bus with the main memory MMP and the exchanges between this memory and the various elements of the decoder DCD are managed by main control means LMC.

The display management means MAF here comprise a multiplexer MUX, a first input of which is linked to the output of the adder of the decoding means MDC, and a second input of which is linked to the output of the memory MMP. The output of the multiplexer is linked to a second buffer memory FF2 of the FIFO type. The output of this buffer memory FF2 is linked to a block/line converter BRC to whose structure and function is discussed in greater detail below. The output of the block BRC is linked to a video controller VDCTL catering for the management of the display screen AFF. The output of the multiplexer MUX is linked to one or other of its two inputs depending on a control signal STY representative of the type of image displayed, i.e. in this instance, either a bidirectional image, or an intra or predicted image.

The MPEG standards advocate that the memory MMP comprise an area of compressed data ZCD of at least 2.6 Megabits in which are written the compressed data awaiting processing, as well as an area ZX serving to store information to be displayed superimposed on the image and sound data. The capacity of this area ZX extending to around 1 Megabit. Apart from these areas, the memory MMP comprises, in the example described here and corresponding to an on-the-fly decoding of the bidirectional images, two additional areas for images ZM1 and ZM2. Each of these areas ZM1 and ZM2 must be capable of storing a PAL image (the largest according to international standards) of 720×576 pixels. By using the 4:2:0 format of the macroblocks, the pixels are the twelve bits and the total size of the image is around 4.9 Megabits.

In the embodiment described here, instead of storing a bidirectional image undergoing reconstruction in a memory area of the memory MMP so as to display it later, this bidirectional image is displayed on the fly, i.e. it is displayed while it is being decoded. This makes it possible to reduce the size of the memory MMP and to provide just two memory areas ZM1 and ZM2 for storing two previously decoded images, of the "intra" or "predicted" type. In this case, the necessary size of the memory MMP is decreased by the size of a memory area and it can then be readily constructed, especially for the PAL standard (the most constraining) from four asynchronous dynamic memories (DRAM) of 256 kwords of 16 bits or from one synchronous dynamic memory (SDRAM) of 16 Megabits.

If it is desired to display a bidirectional image undergoing decoding on the fly, it is initially necessary to display a first frame including the odd lines of the image, and then a second frame including the even lines of the image although the processing preceding display is generally performed on the overall image, i.e. in the order of the lines. This implies, if the decoding means MDC decode the lines at the rate at which they are displayed, that the $(2K1)^{th}$ line must be displayed at the moment at which the decoding means MDC are decoding the $K^{th}$ line. Stated otherwise, at the moment at which the first frame ought to be displayed, the decoder will have been able to decode only half this frame.

Thus, provision is made to decode each bidirectional image twice over the duration of display of this image. In this case, at the moment at which the $2K-1^{th}$ line is to be displayed, 2K lines will have been decoded. More precisely, at the moment at which the first frame is displayed, the complete image will have been decoded as will therefore both frames of this image. Since display is performed on the fly, the second frame which was decoded but not displayed is lost. This second frame is displayed while the image is being decoded a second time.

Figure 3:
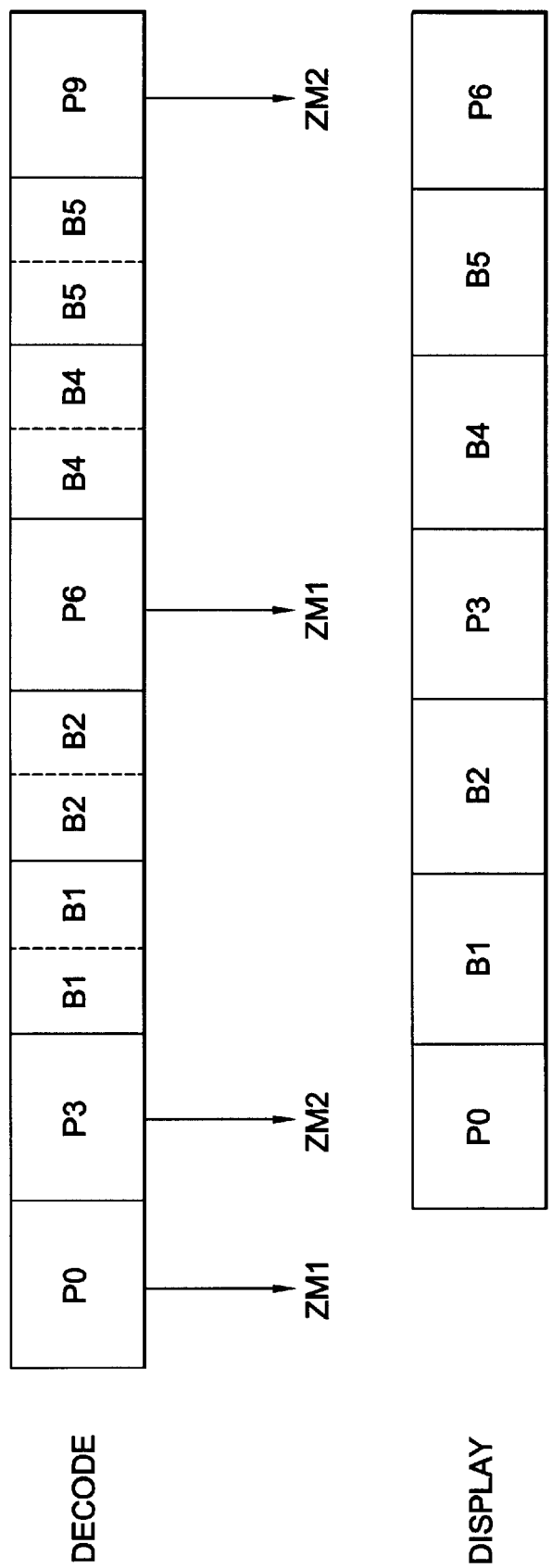
FIG. 3 illustrates the decoding on the fly and the displaying of a bidirectional image.

FIG. 3 represents a time chart of the decoding and displaying of a group of images. The images to be displayed in succession are designated by P0, B1, B2, P3, B4, B5, P6, where the letter P indicates a predicted image and the letter B a bidirectional image. Such a succession of images is conventional according to the MPEG standards. The reconstruction of each predicted image P requires predictor macroblocks fetched from the predicted image (or "intra" image not represented) which precedes it. The reconstruction of each bidirectional image B requires predictor macroblocks fetched from the two predicted images which flank it. Thus, the compressed data corresponding to the images arrive at the decoder DCD in a different order from that of display. Here, these compressed data arrive in the order P0, P3, B1, B2, P6, B4, B5.

Initially, the image P0 is decoded and stored in memory, for example in the area ZM1. While the image P3 is being decoded and stored in the area ZM2, the image P0 is displayed. Next, the image P1 is decoded a first time at double speed while the first frame of the image B1 is displayed on the fly, then the image B1 is decoded a second time at double speed while the second frame of the image B1 is displayed. Each decoding of the image B1 by the decoding means MDC uses predictor macroblocks fetched from the images P0 and P3, which are stored in the areas ZM1 and ZM2. The same operations occur for the bidirectional image B2. Next, the image P6 is decoded and stored in the area ZM1 in place of the image P0 while the image P3 is displayed. The images B4 and B5 are, like the images B1 and B2, decoded twice at double speed while they are displayed. The decoding of the images B4 and B5 use predictor macroblocks to search in the images P3 and P6 which are stored in the areas ZM2 and ZM1.

To perform the decoding on the fly of the bidirectional images, the control means LMC are reprogrammed so as to perform twice the task of transferring to the pipeline circuit PPL the compressed data corresponding to each bidirectional image and stored in the area ZCD. In this regard, the control means are typically clocked at 25.5 MHZ, the pipeline circuit being itself clocked typically at 34 MHZ. Circuits operating at these speeds are entirely realizable within the usual technology.

Figure 4:
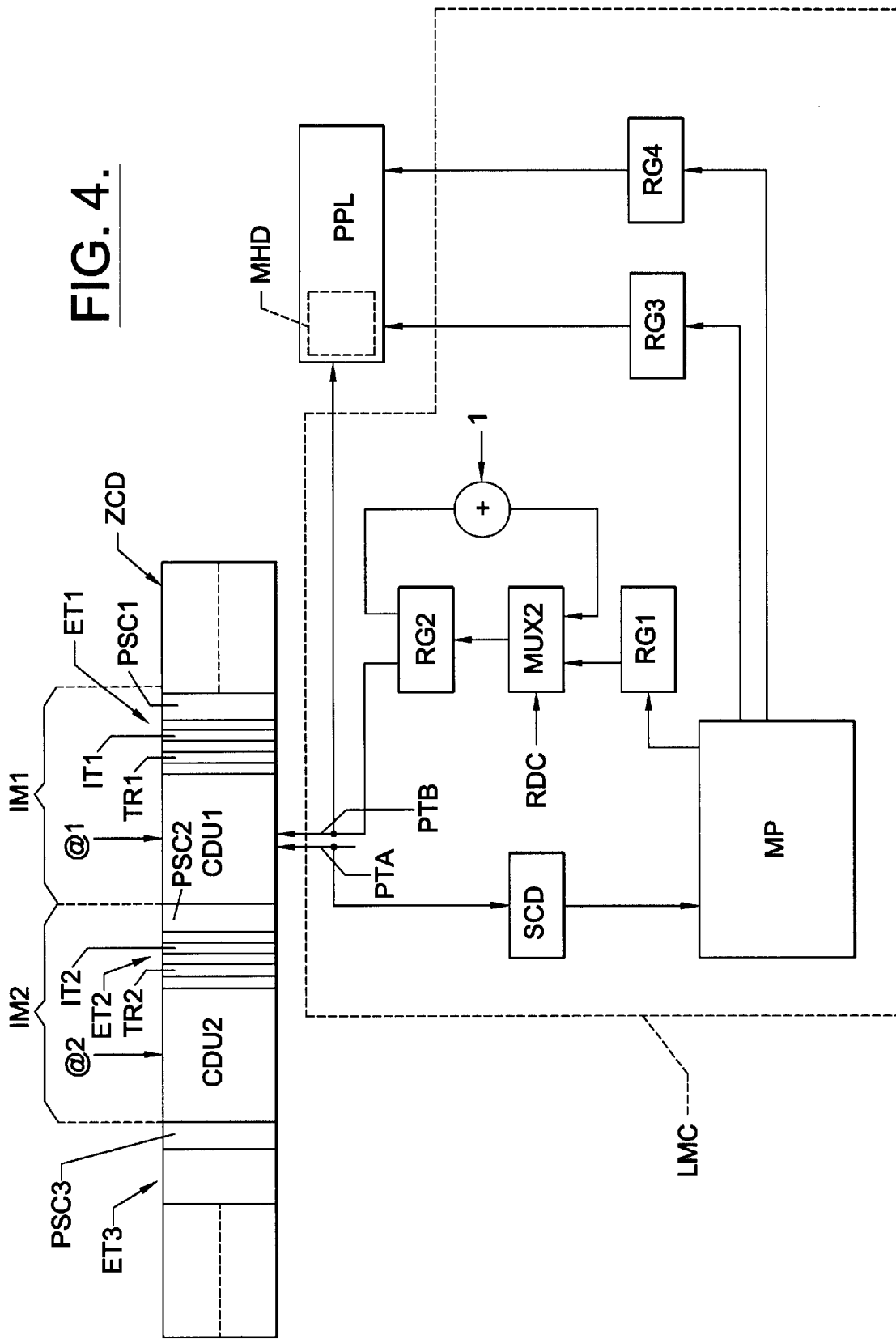
FIGS. 4 and 5 illustrate in greater detail an embodiment and mode of implementation according to the invention, applied especially to the double decoding of a bidirectional image.
Figure 5:
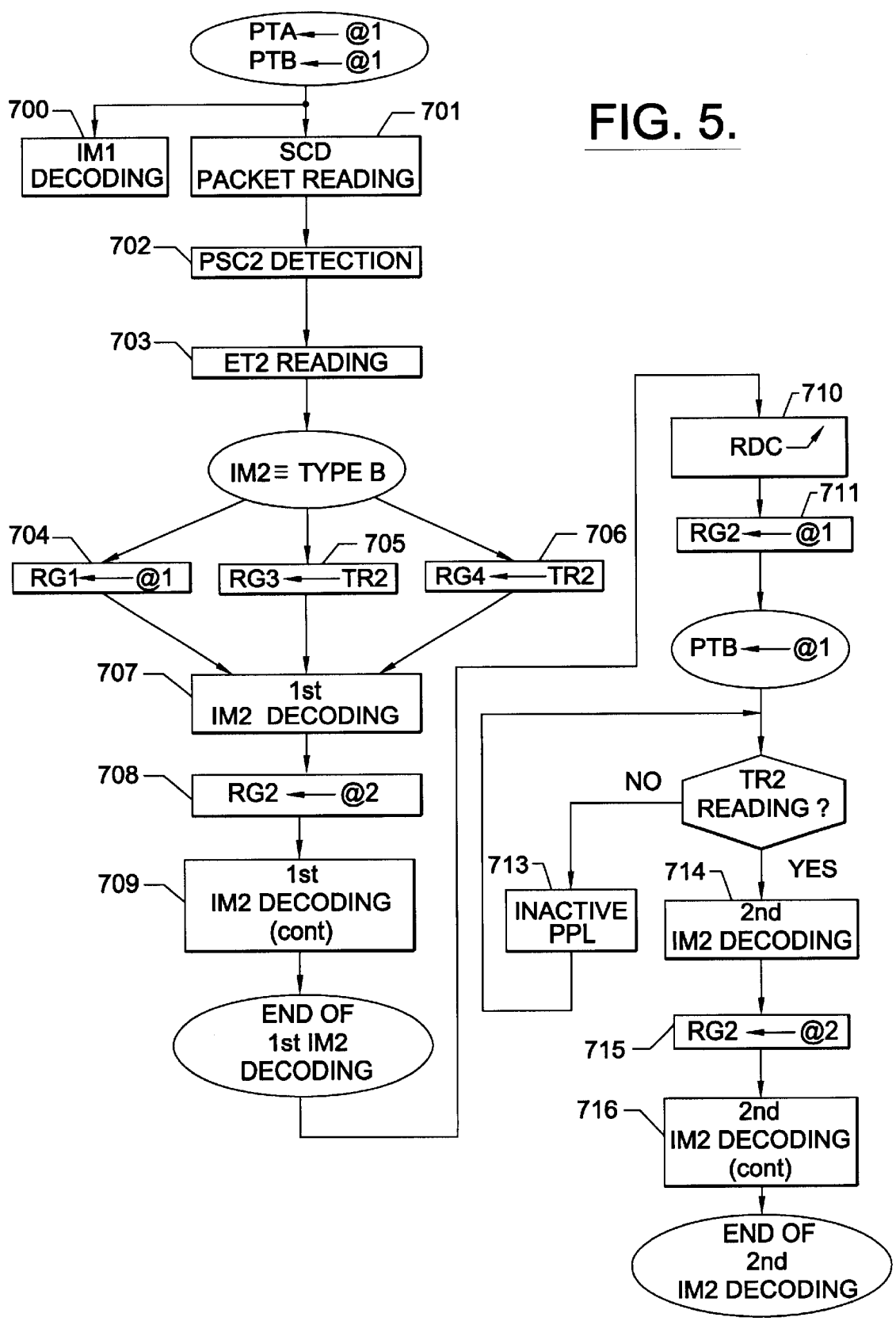

A particularly simple embodiment and mode of implementation according to the invention making it possible for the control means LMC to deliver the compressed data twice to the pipelined circuit PPL is now described while referring more particularly to FIGS. 4 and 5. Conventionally, the stream of MPEG compressed data stored in the memory area ZCD comprises successive groups of compressed data, relating respectively to successive incoming images IM1, IM2, etc. Each data group associated with an image comprises a start-of-image identifier PSC (or "Picture Start Code") followed by a header ET. This header comprises in particular a specific identifier for the image, allowing one-to-one identification of the image in the image sequence. This specific identifier is, for example here, the Temporal Reference TR of the image. The header also comprises a cue IT identifying the type of image, for example "intra", "predicted" or "bidirectional". The header is followed by the useful data CDU of the image.

There is provision for a first address pointer PTA and for a second address pointer PTB each making it possible to read, in packets of bits, the memory area at the successive addresses @1, @2, etc. The control means LMC, architectured around processing means MP which includes a microprocessor, comprise a start-of-image identifier detector SCD embodied, for example, in hard-wired form, and able to detect the presence or absence of a start-of-image identifier PSC in each bit packet extracted at the address pointed at by the first address pointer PTA. Pointer management means which are able to control the position of the second pointer PTB are also linked to the processing means MP. These pointer management means schematically comprise, for example, a first register RG1 whose output is linked to the input of a second register RG2 by way of a multiplexer MUX2 controlled by a control signal RDC representative of the control of a second decoding of an image. The output of the register RG2 is also looped back to its input by way of an address incrementation means and of the multiplexer MUX2. The register RG2 therefore contains the current address of the address pointer PTB.

A third register RG3 is able to store the temporal reference TR of an image while a fourth register RG4 is able to store the cue IT representative of the type of image to be decoded so as to allow the various means of the pipeline circuit PPL to decode the current image appropriately. In fact, each register RG3 and RG4 is able respectively to store the cues TR and IT of the current image undergoing decoding in the circuit PPL and also those of the next image.

Finally, decoding disabling means MHD, which have been represented here for simplifying purposes inside the block PPL, but which could of course be located outside, receive the bits extracted from the memory and contained in the packet pointed at by the pointer PTB, and receive the contents of the register RG3. The function of the decoding disabling means MHD which can be embodied in hard-wired or software form, is discussed in greater detail below.

The manner of operation of the elements which have just been described with reference to FIG. 4 will now be described while referring more particularly to FIG. 5. It is assumed that the decoding of the image IM1 is in progress in the pipeline circuit PPL (step 700) and that the two address pointers PTA and PTB are pointing at the address @1. The bit packet situated at the address @1, extracted from the memory area ZCD, is read by the detector SCD (step 701).

The detector SCD then detects the presence of the start-of-image identifier PSC2 for the image IM2 (step 702). A signal representative of this detection is then sent to the microprocessor MP which reads the string of bits of the packet and in particular the specific identifier ET2 for the image as well as the image's type IT2 (step 703). The image IM2 being of the bidirectional type, therefore requiring redecoding, the microprocessor MP stores in the register RG1 (step 704), the address @1 of the packet containing the start-of-image identifier PSC2 for the image IM2. Moreover, the temporal reference TR2 of the image IM2 is stored in the register REG3 (step 705) and the type IT2 of this image is stored in the register REG4 (step 706).

The first decoding of the image IM2 then begins in the pipeline circuit PPL with the aid of the useful data CDU2 originating from the same packet since the second address pointer PTB is also at the address @1. The register RG2 is next incremented so as to contain the address @2, this consequently causing the address pointer PTB to point to this new address @2 (step 708). The address pointer PTA is also incremented and also points to the address @2. The first decoding of the bidirectional image IM2 is continued with the remainder of the data CDU2 (step 709).

At the end of this first decoding, the circuit VLD contained in the means PPL delivers an end-of-decoding signal which has the effect, under the action of the control signal RDC issued by the microprocessor MP (step 710), of positioning the multiplexer MUX2 to its first input forcing the contents of the register RG2 to the address @1 (step 711). Accordingly, the second address pointer PTB goes back to point to the address @1 again. A difficulty resides here in the fact that in an MPEG data stream, the intervals between the various start-of-image identifiers PSC for the various images are not constant and depend on the contents of the images. Consequently, this difficulty, in combination with the packetwise reading of the memory area ZCD, does not make it possible to ascertain accurately the location at which the start of the image IM2 is situated in the packet.

The invention solves this difficulty by using, in combination with the returning of the pointer PTB back to the address of the packet containing the start-of-image identifier PSC2 for the image to be redecoded, the temporal reference TR2 of the image to be redecoded. More precisely, the decoding disabling means MHD will then sequentially test the various bits of the packet which were read at the address @1 and compare this information with the specific identifier (temporal reference) TR2 of the image IM2, stored in the register RG3. And, so long as this comparison is not positive, i.e. so long as the presence of this temporal reference TR2 has not been detected again, the data supplied by the packet are not taken into account by the pipeline circuit PPL, thereby rendering the pipeline circuit PPL inactive (step 713).

It is only when the comparison result is positive, i.e. when the presence of the temporal reference TR2 has been detected again, that the decoding disabling means MHD authorize the circuit PPL to take the compressed data into account, allowing the second decoding of the bidirectional image (step 714). In the course of this second decoding, the register RG2 is again incremented so as to move the pointer PTB to the address @2 (step 715) to continue the second decoding of the image IM2 (step 716) to its end.

Going back to the general manner of operation of the decoder DCD, the "intra" and "predicted" images are, by a conventional mechanism of queries, sent to the memory MMP at the output of the adder while each decoded bidirectional image B is transmitted, macroblock by macroblock, to the buffer memory FF2 by way of the multiplexer controlled by the signal STY issued by the control means LMC. When an "intra" or "predicted" image stored in the memory MMP is to be displayed, the multiplexer MUX is then instructed on its second input by the signal STY so as to store the macroblocks of the image, which were extracted successively from the memory MMP, in the buffer memory FF2.

Figure 6:
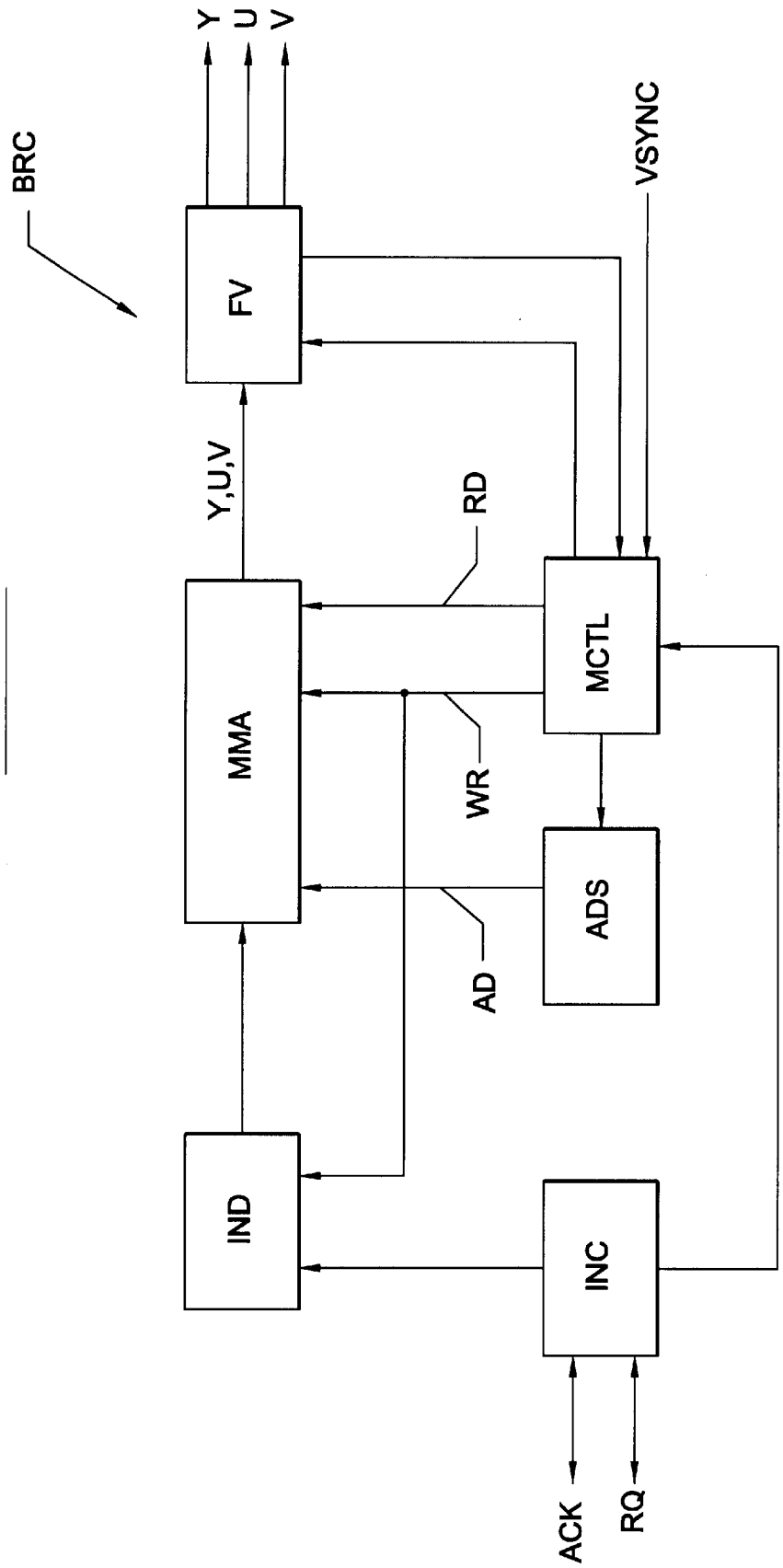
FIG. 6 is a more detailed schematic overview of a block/line converter according to the invention belonging to the device of FIG. 2.

The images output by the multiplexer MUX are stored sequentially in the buffer memory FF2, macroblock by macroblock. On the other hand, the video controller VDCTL requires line-by-line reception of the pixels of the image. It is for this reason that a block/line converter BRC is interposed between the buffer memory FF2 and the video controller VDCTL. As illustrated more precisely in FIG. 6, this converter BRC comprises an input interface IND receiving the various luminance and chrominance blocks of each macroblock stored in the buffer memory FF2. This input interface IND is controlled by an input controller INC by means of enquiry RQ and acknowledgment ACK signals. The data are then written in succession to an auxiliary memory MMA whose addresses $A_{i,j}$ are determined in succession by an address sequencer ADS. The various values of luminance Y and chrominance U and V are extracted line by line from the memory MMA and delivered to a filtering circuit FV which, when it is activated, makes it possible to perform a vertical filtering on these lines, i.e. for example a weighted average between the various values of the pixels of these lines so as to deliver filtered values of luminance and chrominance. The converter BRC is controlled in a general manner by a general controller MCTL receiving in particular a frame synchronization signal VSYNC supplied by the video controller VDCTL. This signal VSYNC makes it possible to perform a parity selection. This is because, with each decoding, only one frame is displayed, i.e. just the even lines or just the odd lines. Thus, the converter BRC sorts among the lines of the blocks which it receives from the buffer memory FF2 those lines whose parity corresponds to that of the frame to be displayed. It is for this reason that storage in the auxiliary memory MMA is referred to as half-macroblock by half-macroblock (each half-macroblock corresponding to eight lines). Thus, the capacity of this converter BRC is eight lines although the macroblocks correspond to sixteen lines. Stated otherwise, the memory MMA is capable of storing at least one row of half-macroblocks (for example a row of 45 half-macroblocks) corresponding to a predetermined number of lines of the frame to be displayed (in this instance eight).

The memory MMA is a dynamic memory which may be regarded as a large-size FIFO, with the exception of the fact that accesses are not consecutive since this memory is read linewise and written blockwise (in half-macroblocks). In fact, the control means MCTL and the address sequencer are programmed in such a way as to allow the sequential writing of the data of a half-macroblock as soon as sufficient room has been freed in the memory by the display procedure. More precisely, the address sequencer calculates the current address $A_{i,j}$ of the auxiliary memory at which current data intended for display is read before being replaced by current data of a half-macroblock by the following:

$$A_{i+1,j} = (A_{i,j} + x_j) \text{ modulo (MN-1)}$$

$$x_{j+1} = Nx_j \text{ modulo (MN-1)}$$

In this, $x_1=1$, M denotes the number of lines of the auxiliary memory, N denotes the number of data per line, and n denotes the total number of lines of each frame. Moreover, $0 < i < MN-1$ and $1 < j < n$.

By using this auxiliary memory of the converter BRC it is possible to limit the number of page openings for displaying "intra" or "predicted" images stored in the main memory MMP. This is because, if the memory MMP is regarded as being organized into memory pages (FIG. 7), each macroblock MB of the image stored in the area ZM1 for example, is stored wholly in a page PA of the memory area ZM1. For simplification purposes, only a single macroblock per page has been represented in FIG. 7, it being understood that in practice each memory page contains two macroblocks. In FIG. 7, the first row RMB1 of macroblock MB1–MBk corresponding to the first sixteen lines of the image stored in the area ZM1 therefore extends over memory pages PA1–PAk. Storage in the auxiliary memory MMA of the row of half-macroblocks corresponding to the eight lines of like parities therefore requires k page openings. The subsequent display, line by line, of the eight lines stored in the memory MMA does not therefore require any more page openings. The total number of page change cycles necessary for the complete display of each frame of an image stored in the memory MMP is therefore especially reduced with respect to a particular case in which the pixels of each frame are extracted line by line directly from the memory MMP. This is because, in such a particular case, it would be necessary to perform k page openings per frame line.

The person skilled in the art will therefore have noted that an appreciable reduction is then obtained in the memory passband used. Furthermore, the same conversion block BRC is used and, consequently, the same auxiliary memory MMA to display the "intra" and "predicted" images stored in the memory MMP, and to display directly the bidirectional images decoded on the fly.

Finally, since the auxiliary memory MMA contains a predetermined number of lines, in this instance eight, it is possible to connect the filtering means FV directly at the output of the memory MMA and thus to perform on command a vertical filtering of at least two lines contained in the memory MMA without using delay lines to do so (as would have been the case if the data of the frame had been extracted directly from the memory MMP line by line).

That which is claimed is:

1. A method for decoding an image including compressed data, the compressed data comprising successive groups of compressed data, which groups relate respectively to successive inbound images, some of which require two successive decodings, each data group associated with an image comprising a start-of-image identifier, followed by a header containing a specific identifier of the image, followed by useful data, the method comprising the steps of:
    storing a stream of compressed data in a memory area of a dynamic memory;
    reading the stream of compressed data in packets of bits located at consecutive addresses of the memory area;
    detecting the presence or the absence of the start-of-image identifier for the packets read from the memory area;
    storing the address of a relevant packet together with the specific identifier of the image when a detected start-of-image identifier corresponds to an image requiring two successive decodings;
    performing a first decoding of the useful data of the image;
    reading the packet data at the stored address from the memory area again; and
    performing the second decoding of the image by decoding the packet data following the specific identifier and ignoring the packet data preceding the specific identifier.

2. A method according to claim 1, wherein the specific identifier is the image's temporal identifier contained in the header.

3. A method according to claim 1, wherein the image requiring two successive decodings is a bidirectional type image.

4. A method for decoding an image including compressed data, the compressed data relating to successive images, the compressed data associated with an image comprising a start-of-image identifier, a header containing a specific identifier of the image, and useful data, the method comprising the steps of:
    storing compressed data in a memory;
    reading the compressed data in packets of bits located in the memory;
    detecting the presence of a start-of-image identifier for the packets read from the memory;
    storing the address of a relevant packet when a detected start-of-image identifier corresponds to an image requiring two successive decodings;
    storing the specific identifier of the image requiring two successive decodings;
    decoding the image;
    reading the packet bits at the stored address again; and
    decoding the image again by decoding the packet data following the specific identifier and ignoring the packet data preceding the specific identifier.

5. A method according to claim 4, wherein the specific identifier is the image's temporal identifier contained in the header.

6. A method according to claim 4, wherein the image requiring two successive decodings is a bidirectional type image.

7. A method according to claim 4, wherein storing compressed data in a memory comprises the step of storing a stream of compressed data in a memory area of a dynamic memory.

8. A method according to claim 7, wherein reading the compressed data comprises the step of reading the stream of compressed data in packets of bits located at consecutive addresses of the memory area.

9. A method for decoding an image including compressed data, the compressed data relating to successive images, the compressed data associated with an image comprising a start-of-image identifier, a header containing a specific identifier of the image, and useful data, the method comprising the steps of:

storing the compressed data in a memory;

reading the compressed data stored in the memory;

storing an address of a relevant packet when a start-of-image identifier corresponds to a bidirectional image;

decoding the bidirectional image;

reading the compressed data at the stored address again; and decoding the bidirectional image again by decoding data following the specific identifier and ignoring data preceding the specific identifier.

10. A method according to claim 9, wherein the specific identifier is the image's temporal identifier contained in the header.

11. A method according to claim 9, further comprising storing the specific identifier of the bidirectional image.

12. A method according to claim 9, wherein storing compressed data in a memory comprises the step of storing a stream of compressed data in a memory area of a dynamic memory.

13. A method according to claim 12, wherein reading the compressed data comprises the step of reading the stream of compressed data in packets of bits located at consecutive addresses of the memory area.

14. A device for decoding an image including compressed data, the compressed data comprising successive groups of compressed data, which groups relate respectively to successive inbound images, some of which require two successive decodings, each data group associated with an image comprising a start-of-image identifier, followed by a header containing a specific identifier of the image, followed by useful data, the device comprising:

a dynamic memory including a memory area for storing a stream of compressed data;

a first address pointer and a second address pointer for making it possible to read the memory area in packets of bits;

a start-of-image identifier detector for detecting the presence or the absence of the start-of-image identifier in each packet read at an address pointed at by the first address pointer;

first storage means for storing the address of the packet containing the start-of-image identifier of the current image when a first control signal represents the presence of a current image requiring two successive decodings;

second storage means for storing the specific identifier of the current image;

processing means, linked to the start-of-image identifier detector, for providing the first control signal;

a decoding circuit for decoding the bits of the packet pointed at by the second address pointer;

pointer management means for, in response to a second control signal transmitted by the decoding circuit and representative of the end of a first decoding of an image, moving the second address pointer to the address stored in the first storage means; and decoding disabling means for comparing the specific identifier stored in the second storage means with the packet bits at the address stored in the first storage means, and for disabling the decoding circuit until the specific identifier of the image is detected again.

15. A device according to claim 14, wherein the specific identifier is the image's temporal identifier contained in the header.

16. A device according to claim 14, wherein the image requiring two successive decodings is a bidirectional type image.

17. A device for decoding an image including compressed data, the compressed data relating to successive images, the compressed data associated with an image comprising a start-of-image identifier, a header containing a specific identifier of the image, and useful data, the device comprising:

a memory for storing compressed data;

a first register for storing an address of compressed data containing the start-of-image identifier of a bidirectional image to be decoded;

a decoding circuit for decoding the compressed data of the bidirectional image; and a decoding disabler for reading the compressed data at the address stored in the first register, and for disabling the decoding circuit until the specific identifier of the bidirectional image is detected and for enabling the decoding circuit to decode the compressed data of the bidirectional image again when the specific identifier of the bidirectional image is detected.

18. A device according to claim 17, wherein the specific identifier is the image's temporal identifier contained in the header.

19. A device according to claim 17, wherein the memory for storing compressed data comprises a dynamic memory including a memory area for storing a stream of compressed data.

20. A device according to claim 17, further comprising a second register for storing the specific identifier of the bidirectional image, wherein the decoding disabler is for comparing the specific identifier stored in the second register with the compressed data at the address stored in the first register.

21. A device according to claim 17, further comprising a processor for providing a first control signal which indicates the presence of the bidirectional image, wherein the first register stores the address of the compressed data containing the start-of-image identifier of the bidirectional image in response to the first control signal.

22. A device according to claim 21, further comprising:

a first address pointer and a second address pointer for making it possible to read the memory in packets of bits;

a detector for detecting the presence of a start-of-image identifier in each packet read at an address pointed at by the first address pointer; and a pointer manager for moving the second address pointer to the address stored in the first register after a first decoding of the bidirectional image;

wherein the decoding circuit is for providing a second control signal which indicates the end of the first decoding of the bidirectional image and the pointer manager moves the second address pointer to the address stored in the first register in response to the second control signal.

* * * * *

UNITED STATES PATENT AND TRADEMARK OFFICE
CERTIFICATE OF CORRECTION

PATENT NO.     : 6,275,535 B1
DATED          : August 14, 2001
INVENTOR(S)    : Richard Bramley and Patrice Woodward It is certified that error appears in the above-identified patent and that said Letters Patent is hereby corrected as shown below:

<u>Column 5,</u>
Line 35, delete "$(2K1)^{th}$" insert -- $(2K-1)^{th}$ --

Signed and Sealed this

Ninth Day of April, 2002

Attest:

JAMES E. ROGAN
*Attesting Officer*    *Director of the United States Patent and Trademark Office*